United States Patent
Gonze et al.

(10) Patent No.: US 8,104,269 B2
(45) Date of Patent: Jan. 31, 2012

(54) CATALYTIC COMBUSTOR STRATEGY USING HC ADSORBER

(75) Inventors: Eugene V. Gonze, Pinckney, MI (US); Halim G. Santoso, Novi, MI (US)

(73) Assignee: GM Global Technology Operations LLC

( * ) Notice: Subject to any disclaimer, the term of this patent is extended or adjusted under 35 U.S.C. 154(b) by 571 days.

(21) Appl. No.: 12/268,730

(22) Filed: Nov. 11, 2008

(65) Prior Publication Data

US 2010/0115921 A1    May 13, 2010

(51) Int. Cl.
*F01N 3/00* (2006.01)

(52) U.S. Cl. ............ 60/286; 60/274; 60/289; 60/295; 60/300

(58) Field of Classification Search .......... 60/274, 60/284, 286, 289, 297, 300, 303, 295
See application file for complete search history.

(56) References Cited

U.S. PATENT DOCUMENTS

| | | | | |
|---|---|---|---|---|
| 5,271,906 A | * | 12/1993 | Yuuki et al. | 422/177 |
| 5,802,845 A | * | 9/1998 | Abe et al. | 60/274 |
| 5,979,157 A | * | 11/1999 | Kinugasa et al. | 60/274 |
| 6,122,910 A | * | 9/2000 | Hoshi et al. | 60/297 |
| 6,155,044 A | * | 12/2000 | Kaiho et al. | 60/297 |
| 6,729,129 B2 | * | 5/2004 | Yamamoto et al. | 60/297 |

\* cited by examiner

*Primary Examiner* — Binh Q Tran

(57) ABSTRACT

A vehicle system includes a hydrocarbon adsorber, a catalyst, a control module, and a heater. The hydrocarbon adsorber receives first exhaust gases, adsorbs hydrocarbons from the first exhaust gases, and outputs second exhaust gases. The catalyst receives the second exhaust gases. The control module controls a heater and fuel injectors. The heater heats a portion of the catalyst to a predetermined temperature. The control module controls the fuel injectors to generate a fuel-rich air/fuel mixture when the portion of the catalyst is heated to the predetermined temperature.

20 Claims, 3 Drawing Sheets

CATALYTIC COMBUSTOR STRATEGY USING HC ADSORBER

FIELD

The present invention relates to control systems for internal combustion engines, and more particularly to a system and method for reducing emissions from an internal combustion engine.

BACKGROUND

The background description provided herein is for the purpose of generally presenting the context of the disclosure. Work of the presently named inventors, to the extent it is described in this background section, as Nell as aspects of the description that may not otherwise qualify as prior art at the time of filing, are neither expressly nor impliedly admitted as prior art against the present disclosure.

When an internal combustion engine is initially started, the engine and an exhaust system of the engine are cold. Further, an intake manifold absolute pressure (MAP) is high (i.e., near atmospheric pressure) because the engine is initially turning at a very low rate. The combination of low temperature and high pressure make it difficult for fuel to vaporize in the cylinders. Incompletely vaporized fuel is not completely combusted. A portion of fuel that is riot completely combusted at start-up causes increased hydrocarbon (HC) and carbon monoxide (CO) emissions.

Vehicles that include an internal combustion engine may also include a catalytic converter to treat exhaust. The flow of exhaust from the engine to the catalytic converter may be called an exhaust stream. The catalytic converter includes a catalyst that catalyzes the oxidation of HC and CO as well as the reduction of nitrogen oxides in the exhaust stream. Typically, the catalyst does not efficiently control emissions at start-up because: 1) a higher fraction of fuel remains unburned and is subsequently exhausted, and 2) the catalyst is not sufficiently hot.

The catalyst operates efficiently when the catalyst reaches an operating temperature called a light-off temperature. The catalyst reaches the light-off temperature after the engine and the exhaust system have been adequately heated from engine operation. As time elapses after the engine is started, the engine speed increases, the MAP decreases, and the operating temperature of the catalyst increases. The combination of low MAP and increased operating temperature allows the fuel to vaporize adequately, thereby resulting in more complete combustion of the fuel.

SUMMARY

A vehicle system comprises a hydrocarbon adsorber, a catalyst, a control module, and a heater. The hydrocarbon adsorber receives first exhaust gases, adsorbs hydrocarbons from the first exhaust gases, and outputs second exhaust gases. The catalyst receives the second exhaust gases. The control module controls a heater and fuel injectors. The heater heats a portion of the catalyst to a predetermined temperature. The control module controls the fuel injectors to generate a fuel-rich air/fuel mixture when the portion of the catalyst is heated to this predetermined temperature.

A vehicle control method comprises receiving first exhaust gases, adsorbing hydrocarbons from the first exhaust gases, and outputting second exhaust gases to a catalyst after adsorbing hydrocarbons from the first exhaust gases. Additionally, the method comprises heating a portion of the catalyst to a predetermined temperature and generating a fuel-rich air/fuel mixture when the portion of the catalyst is heated to the predetermined temperature.

BRIEF DESCRIPTION OF THE DRAWINGS

The drawings described herein are for illustration purposes only and are not intended to limit the scope of the present disclosure in any way.

DETAILED DESCRIPTION

Figure 1:
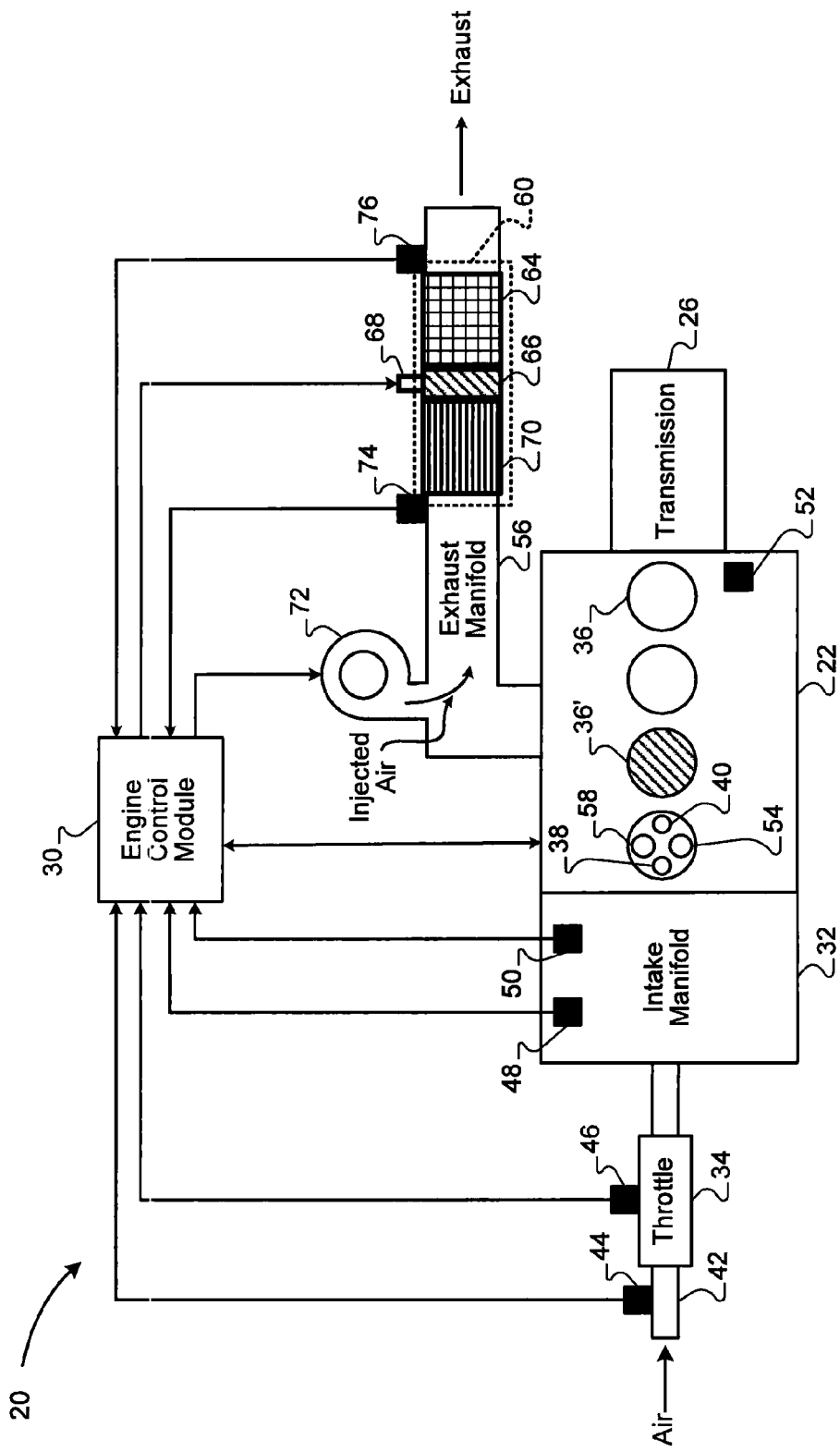
FIG. 1 is a functional block diagram of a vehicle system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Typically, hydrocarbon (HC) and carbon monoxide (CO) exhaust emissions are high when the internal combustion engine is initially started. At start-up, exhaust emissions may be reduced and performance of the catalyst may be increased in many ways. For example, the engine speed may be increased at idle. Ignition timing may be retarded. The fuel delivered to the cylinders may be reduced. A secondary air pump may be added to the exhaust system to supply the catalyst with oxygen to carry out the oxidation reaction.

A catalytic combustion system according to the present disclosure reduces emission levels at start-up. The system includes activating a portion of this catalyst with a heater and trapping HC emissions with an adsorber. The system further includes pumping fresh air into the exhaust stream and enriching an air/fuel mixture to create an exothermic reaction within the catalytic combustion system. The exothermic reaction within the catalytic combustion system rapidly activates the catalyst and reduces further exhaust emissions.

Referring now to FIG. 1, an exemplary vehicle system 20 includes a combustion engine 22 that drives a transmission 26. A spark ignited engine is illustrated, but a compression ignition engine is also contemplated. A throttle 34 may regulate airflow into an intake manifold 32. Air within the intake manifold 32 is distributed into cylinders 36. An engine control module 30 may deactivate one or more selected cylinders 36' during engine operation. The selected cylinder 36' is deactivated when the engine control module 30 does not signal a corresponding fuel injector 38 to inject fuel into the selected cylinder 36'. A cylinder 36 is active when the engine control module 30 signals the corresponding fuel injector 38 to inject fuel into the cylinder 36. Each cylinder 36 may include a spark plug 40 for igniting the air/fuel mixture. Alternatively, the air/fuel mixture may be ignited by compression in a diesel application. Although FIG. 1 depicts four cylinders 36, the engine 22 may include additional or fewer cylinders 36. For example, engines having 5, 6, 8, 10, 12, and 16 cylinders are contemplated. The engine 22 may also provide for an active fuel management system (not shown).

The engine control module 30 communicates with components of the vehicle system 20. Components of the vehicle system 20 include the engine 22, sensors, and controls as discussed herein. The engine control module 30 may implement the catalytic combustion system of the present disclosure.

Air is passed from an inlet 42 through a mass airflow (MAF) sensor 44, such as a mass airflow meter. The MAF sensor 44 generates a MAF signal that indicates a rate of air flowing through the MAF sensor 44. Inlet air may be metered to the engine 22 via the throttle 34. For example only, the throttle 34 may be a butterfly valve that rotates within the inlet air path 42. The throttle 34 is adjusted based on an engine operating point commanded by an operator and/or a controller. A throttle position sensor (TPS) 46 generates a TPS signal that indicates a position of the throttle 34.

A manifold pressure (MAP) sensor 48 is positioned in the engine intake manifold 32 between the throttle 34 and the engine 22. The MAP sensor 48 generates a MAP signal that indicates manifold absolute air pressure. A manifold air temperature (MAT) sensor 50 located in the intake manifold 32 generates a MAT signal based on intake air temperature.

An engine crankshaft (not shown) rotates at engine speed or a rate that is proportional to the engine speed. A crankshaft sensor 52 senses a position of the crankshaft and generates a crankshaft position (CSP) signal. The CSP signal may depend on the rotational speed of the crankshaft and cylinder events. For example only, the crankshaft sensor 52 may be a variable reluctance sensor. The engine speed and cylinder events may be sensed using other suitable methods.

An intake valve 54 selectively opens and closes to enable air to enter the cylinder 36. An intake camshaft (not shown) regulates intake valve position. A piston (not shown) compresses the air/fuel mixture within the cylinder 36. The engine control module 30 controls the fuel injector 38 to inject fuel into the cylinder 36. The engine control module 30 may also control the spark plug 40 to initiate combustion of the air/fuel mixture, thereby driving the piston in the cylinder 36. Alternatively, the air/fuel mixture may be ignited by compression in a diesel application. The piston drives the crankshaft to produce drive torque. Combustion exhaust within the cylinder 36 is forced out through an exhaust manifold 56 when an exhaust valve 58 is in an open position. An exhaust camshaft (not shown) regulates exhaust valve position. Although single intake and exhaust valves 54, 58 are illustrated, the engine 22 may include multiple intake and exhaust valves 54, 58 per cylinder 36.

Throughout the disclosure, the terms "upstream" and "downstream" are used to describe relative location of components that interact with the exhaust stream. A first component located "upstream" to a second component interacts with the exhaust stream before the second component interacts with the exhaust stream. The second component is located "downstream" relative to the first component.

A catalytic combustor 60 treats exhaust to reduce emission levels. The catalytic combustor 60 includes a catalyst 64 and an electrically heated catalyst (EHC) 66. An electrical heater 68 heats the EHC 66 based on signals received from the engine control module 30. The electrical heater 68 may heat the EHC 66 until the EHC 66 is active. The EHC 66 is active when the EHC 66 has reached the light-off temperature.

The catalyst 64 and the EHC 66 control emissions by increasing the rate of oxidization of HC and CO and by increasing the rate of reduction of nitrogen oxides (NOx). A diesel application may employ additional strategies for reducing NOx, such as a selective catalytic reduction. The catalytic combustor 60 includes a hydrocarbon adsorber 70 that traps HC from the exhaust. The hydrocarbon adsorber 70 is located upstream relative to the catalyst 64 and the EHC 66. The hydrocarbon adsorber 70 reduces the emissions of HC during a cold start when the catalyst 64 and the EHC 66 are not active. The hydrocarbon adsorber 70 releases the stored HC after the hydrocarbon adsorber 70 is warmed by the activated catalyst 64 and the activated EHC 66. The catalyst 64 and the EHC 66 are sufficiently warmed to oxidize the HC when the HC is released from the hydrocarbon adsorber 70.

The catalyst 64 and the EHC 66 use air or oxygen to enable oxidation. The engine control module 30 may activate an air pump 72 to pump air into the exhaust stream. Adding air to the exhaust stream of the catalytic combustor 60 increases the rate of oxidation of HC and CO in the EHC 66 and the catalyst 64. The increased rate of oxidization quickly heats the catalyst 64, which further accelerates the conversion of HC, CO, and NOx. Diesel applications may eliminate the air pump 72 because the excess oxygen in the diesel exhaust may be sufficient for a diesel oxidation catalyst to oxidize HC and CO. The vehicle system 20 may include inlet and outlet oxygen sensors 74, 76 that generate oxygen level signals indicative of oxygen levels in the exhaust. For example only, the inlet oxygen sensor 74 may be located upstream relative to the catalytic combustor 60. For example only, the catalytic combustor 60 may be located upstream relative to the outlet oxygen sensor 76. The engine control module 30 may determine the efficiency of the catalytic combustor 60 based on the oxygen level signals.

Figure 2:
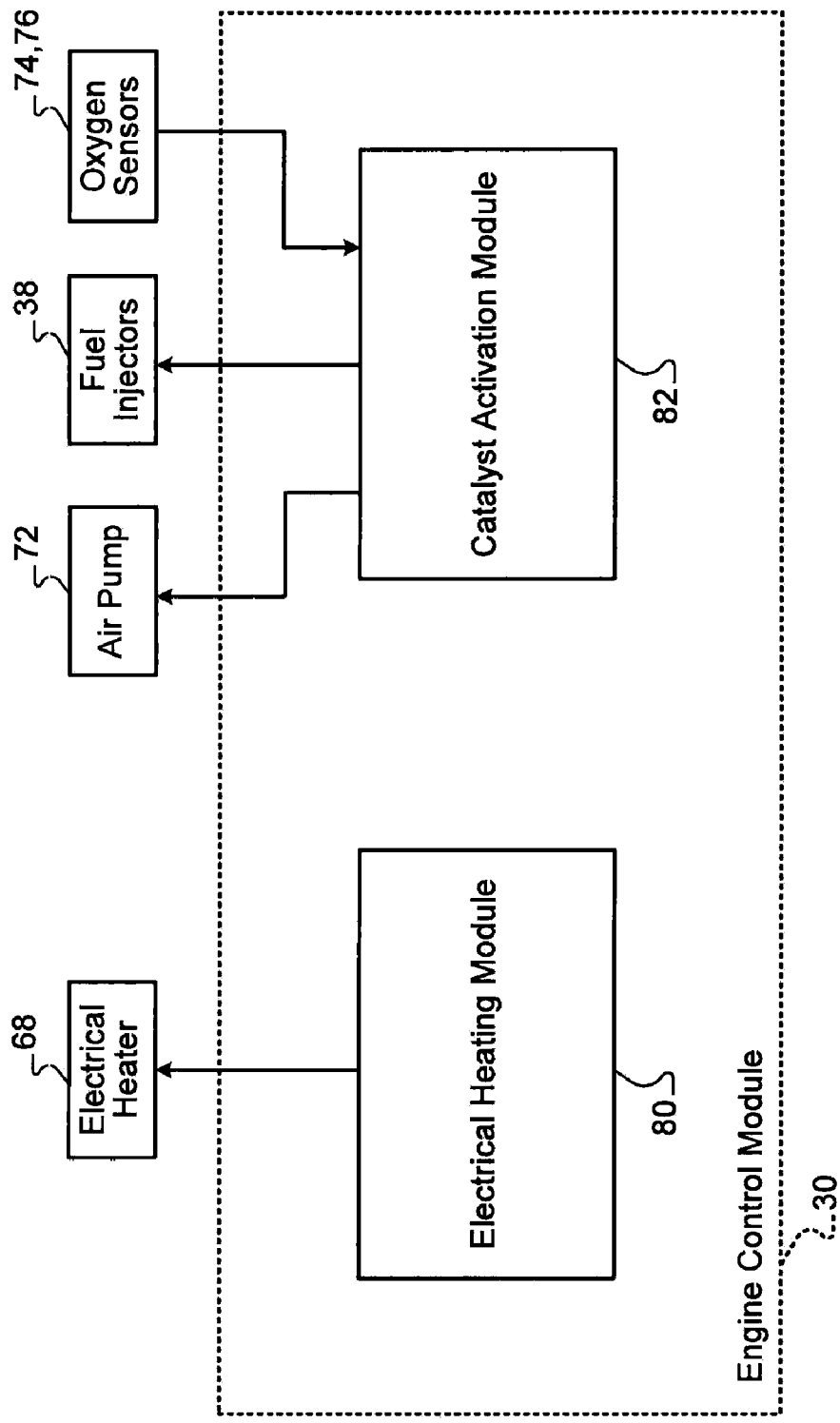
FIG. 2 is a functional block diagram of an engine control module according to the present disclosure.

Referring now to FIG. 2, the engine control module 30 includes an electrical heating module 80 and a catalyst activation module 82. The engine control module 30 receives input signals from the vehicle system 20. The input signals include the MAF, TPS, MAP, MAT, CSP, and oxygen level signals. The input signal are hereinafter referred to as "vehicle system signals." The engine control module 30 processes the vehicle system signals and generates timed engine control commands that are output to the vehicle system 20. For example, engine control commands may control the throttle 34, the fuel injectors 38, the spark plugs 40, the electrical heater 68, and the air pump 72.

The electrical heating module 80 commands the electrical heater 68 to heat the EHC 66 when the engine 22 is started. For example only, the electrical heater 68 may operate at a voltage of 12-24 volts and at a power of 1-3 kilowatts although other ranges are anticipated. The electrical heating module 80 commands the electrical heater 68 to heat the EHC 66 until the EHC 66 is active. The electrical heating module 80 may determine that the EHC 66 is active based on the vehicle system signals. For example, the electrical heating module 80 may determine that the EHC 66 is active based on the oxygen level signals. The electrical heating module 80 may also determine that the EHC 66 is active based on a predetermined amount of time that has elapsed after the engine 22 is cold started.

The catalyst activation module 82 signals the fuel injectors 38 to generate a fuel-rich air/fuel mixture when the EHC 66 is active. A fuel-rich air/fuel mixture may have an air/fuel mass ratio less than a stoichiometric ratio (e.g., less than 14.7 for gasoline). The fuel-rich air/fuel mixture increases CO concentration in the exhaust stream.

In a spark ignited application, the catalyst activation module 82 may activate the air pump 72 to pump air into the exhaust stream when the EHC 66 is active. The increase in air and CO in the exhaust stream react with the EHC 66 to produce an exothermic reaction in the catalytic combustor 60. The fuel injectors 38 may continue to generate the fuel-rich air/fuel mixture, and the air pump 72 may continue to pump air into the exhaust stream for a predetermined period of time until the catalyst 64 is active. Alternatively, the catalyst activation module 82 may determine that the catalyst 64 is active based on the vehicle system signals that are indicative of the performance of the catalytic combustor 60. For example, the catalyst activation module 82 may determine that the catalyst 64 is active based on the oxygen level signals. The catalyst activation module 82 disables the air pump 72 and signals the fuel injectors 38 to stop generating the fuel-rich air/fuel mixture when the catalyst 64 is active.

Figure 3:
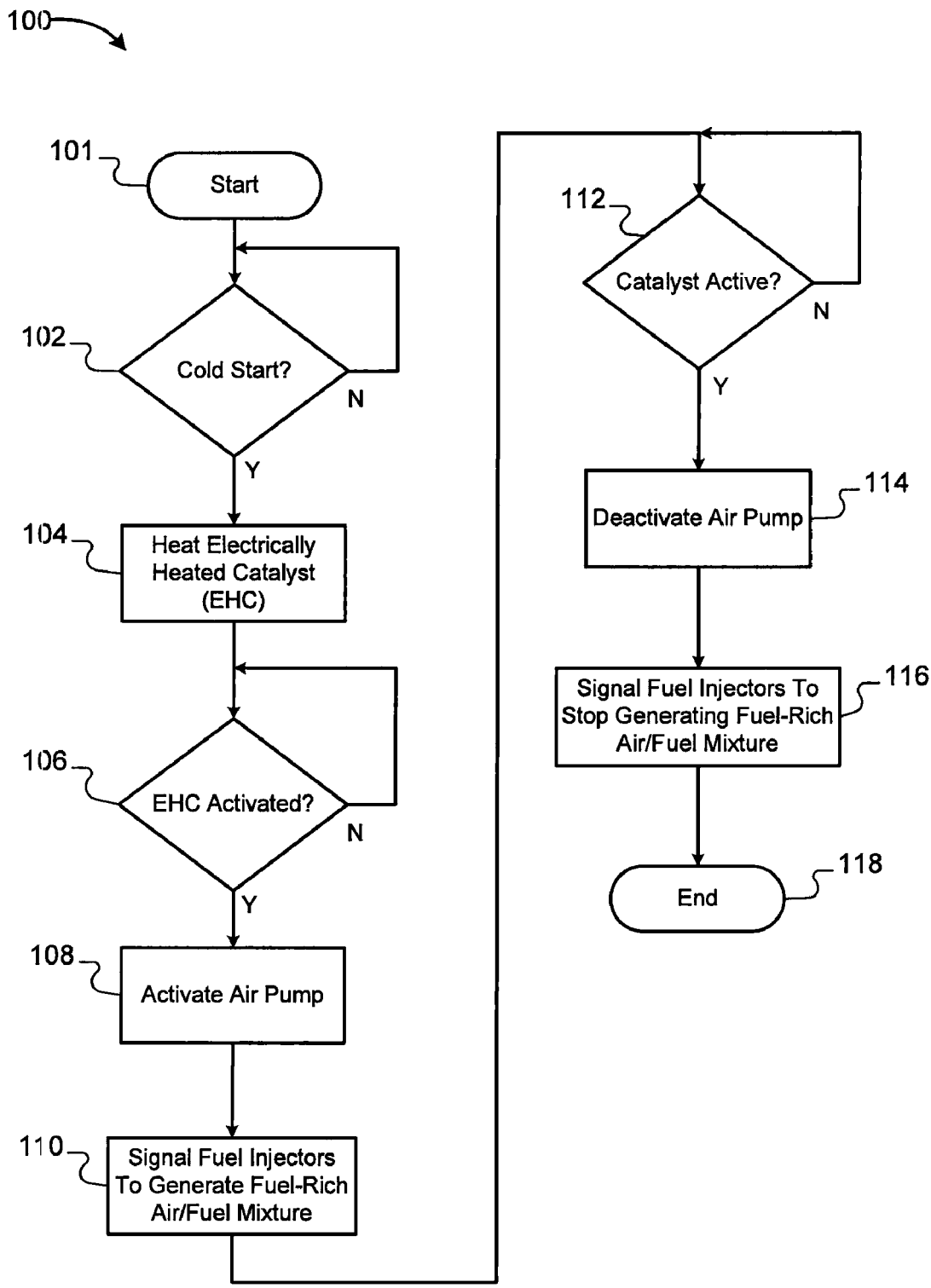
FIG. 3 is a flow diagram that illustrates the steps of a method for catalytic combustion according to the present disclosure.

Referring now to FIG. 3, a method 100 for catalytic combustion starts in step 101. In step 102, the electrical heating module 80 determines whether an engine cold start has occurred. If true, the method 100 continues to step 104. If false, the method 100 repeats step 102. In step 104, the electrical heating module 80 signals the electrical heater 68 to start heating the EHC 66. In step 106, the electrical heating module 80 determines whether the EHC 66 is activated. If false, the method 100 repeats step 106. If true, the method 100 continues to step 108. In step 108, the catalyst activation module 82 activates the air pump 72 to pump air into the exhaust stream. In step 110, the catalyst activation module 82 signals the fuel injectors 38 to generate a fuel-rich air/fuel mixture. In step 112, the catalyst activation module 82 determines whether the catalyst 64 is active. If false, the method 100 repeats step 112. If true, the method 100 continues to step 114. In step 114, the catalyst activation module 82 deactivates the air pump 72. In step 116, the catalyst activation module 82 signals the fuel injectors 38 to stop generating the fuel-rich air/fuel mixture. The method 100 ends in step 118.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A vehicle system comprising:
   a hydrocarbon adsorber that receives first exhaust gases, that adsorbs hydrocarbons from said first exhaust gases, and that outputs second exhaust gases;
   a catalyst that receives said second exhaust gases; and
   a control module that controls a heater and fuel injectors, wherein said heater heats a portion of said catalyst to a predetermined temperature, and
   wherein said control module controls said fuel injectors to generate a fuel-rich air/fuel mixture when said portion of said catalyst is heated to said predetermined temperature.

2. The vehicle system of claim 1 wherein said fuel-rich air/fuel mixture has an air/fuel mass ratio less than a stoichiometric ratio.

3. The vehicle system of claim 1 wherein said control module controls an air pump, to pump air into said first exhaust gases when said portion of said catalyst is heated to said predetermined temperature.

4. The vehicle system of claim 1 wherein said hydrocarbon adsorber releases said hydrocarbons when said catalyst reaches said predetermined temperature.

5. The vehicle system of claim 4 wherein said catalyst treats said hydrocarbons received from said hydrocarbon adsorber.

6. The vehicle system of claim 1 wherein said predetermined temperature includes a catalyst light-off temperature.

7. The vehicle system of claim 1 wherein said heater includes an electrical heater that is operated at a voltage range of 12-24V.

8. The vehicle system of claim 1 wherein said heater includes an electrical heater that is operated at a power range of 1-3 kilowatts.

9. The vehicle system of claim 1 wherein said control module determines that said portion of said catalyst is heated to said predetermined temperature when a predetermined period of time has elapsed after an engine is cold started.

10. The vehicle system of claim 1 wherein said control module determines that said portion of said catalyst is heated to said predetermined temperature based on oxygen level signals.

11. A vehicle control method comprising:
    receiving first exhaust gases;
    adsorbing hydrocarbons from said first exhaust gases;
    outputting second exhaust gases to a catalyst after adsorbing hydrocarbons from said first exhaust gases;
    heating a portion of said catalyst to a predetermined temperature; and
    generating a fuel-rich air/fuel mixture when said portion of said catalyst is heated to said predetermined temperature.

12. The vehicle control method of claim 11 further comprising generating said fuel-rich air/fuel mixture having an air/fuel mass ratio less than a stoichiometric ratio.

13. The vehicle control method of claim 11 further comprising pumping air into said first exhaust gases when said portion of said catalyst is heated to said predetermined temperature.

14. The vehicle control method of claim 11 further comprising releasing said hydrocarbons when said catalyst reaches said predetermined temperature.

15. The vehicle control method of claim 14 further comprising treating said hydrocarbons using said catalyst.

16. The vehicle control method of claim 11 further comprising:
    heating said portion of said catalyst to a catalyst light-off temperature; and
    generating said fuel-rich air/fuel mixture when said portion of said catalyst is heated to said catalyst light-off temperature.

17. The vehicle control method of claim 11 further comprising determining that said portion of said catalyst is heated to said predetermined temperature when a predetermined period of time has elapsed after an engine is cold started.

18. The vehicle control method of claim 11 further comprising determining that said portion of said catalyst is heated to said predetermined temperature based on oxygen level signals.

19. A control system comprising:
    an electrical heating module that controls an electrical heater to heat a portion of a catalyst located downstream relative to a hydrocarbon adsorber; and
    a catalyst activation module that controls fuel injectors to generate a fuel rich air/fuel mixture when said portion of said catalyst is heated to a predetermined temperature.

20. The control system of claim 19 wherein said catalyst activation module:
    controls an air pump located upstream relative to said catalyst; and
    controls said air pump to pump air downstream when said portion of said catalyst is heated to said predetermined temperature.

* * * * *